United States Patent [19]

Ohnishi

[11] Patent Number: 4,806,946
[45] Date of Patent: Feb. 21, 1989

[54] LIGHT BEAM SCANNING RECORDING METHOD
[75] Inventor: Masahiro Ohnishi, Kanagawa, Japan
[73] Assignee: Fuji Photo Film Co., Ltd., Kanagawa, Japan
[21] Appl. No.: 137,288
[22] Filed: Dec. 23, 1987
[30] Foreign Application Priority Data Dec. 29, 1986 [JP] Japan .................................. 61-310247

[51] Int. Cl.$^4$ ............................ G01D 9/00; G01D 9/42
[52] U.S. Cl. ..................................... 346/1.1; 346/108; 350/6.8; 358/296
[58] Field of Search ......................... 346/1.1, 108, 160; 358/296, 300, 302; 350/6.8

[56] References Cited
U.S. PATENT DOCUMENTS 4,560,862 12/1985 Eastman ................................. 350/6.8

Primary Examiner—E. A. Goldberg
Assistant Examiner—Mark Reinhart
Attorney, Agent, or Firm—Sughrue, Mion, Zinn, Macpeak & Seas

[57] ABSTRACT

In a light beam scanning recording method, a continuous tone image is recorded on a photosensitive material by scanning a light beam deflected by a rotating polygon mirror on the photosensitive material and carrying out pulse number modulation or pulse width modulation of the light beam in accordance with image signals. A single picture element string is scanned by the light beam a plural number of times which is equal to integral multiples of the number of mirror surfaces of the rotating polygon mirror. The number of pulses per picture element or the pulse width per picture element is distributed among the plural number of times of scanning so that the total number of pulses per picture element or the total pulse width per picture element in the plural number of times of scanning coincides with a predetermined value.

4 Claims, 4 Drawing Sheets

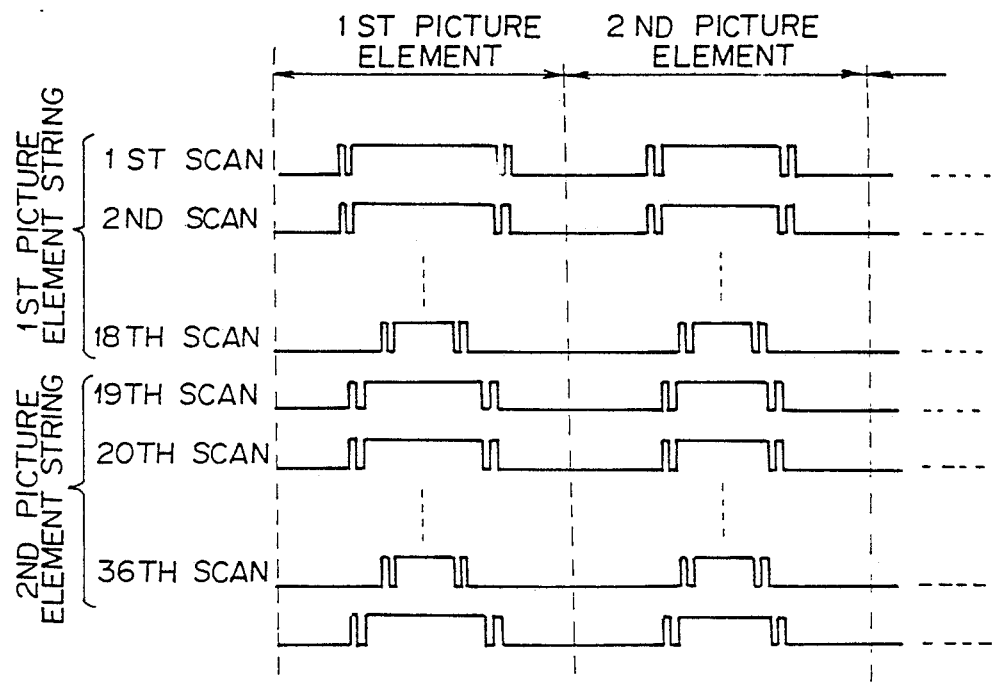

LIGHT BEAM SCANNING RECORDING METHOD

BACKGROUND OF THE INVENTION

1. Field of the Invention

This invention relates to a light beam scanning recording method for recording a continuous tone image on a photosensitive material by scanning a light beam deflected by a rotating polygon mirror on the photosensitive material. This invention particularly relates to a light beam scanning recording method for recording a high-gradation image by eliminating the adverse effects of surface inclination of mirror surfaces of a rotating polygon mirror and variations in reflectivity among the mirror surfaces.

2. Description of the Prior Art

Light beam scanning recording methods wherein a light beam deflected by a light deflector is scanned on a photosensitive material, and the light beam is modulated in accordance with image signals, thereby to record a continuous tone image on the photosensitive material have heretofore been known.

As the light deflector, a rotating polygon mirror is employed in many cases. The rotating polygon mirror is advantageous from the viewpoint of scanning stability over other light deflectors such as a galvanometer mirror.

However, the rotating polygon mirror has the drawback that it exhibits surface inclination of mirror surfaces and deviations in reflectivity among the mirror surfaces, and recording of a high-gradation image is adversely affected thereby. Specifically, in the course of scanning a recording beam by use of the rotating polygon mirror, a single picture element string (a single main scanning line) has heretofore been recorded with the recording beam deflected by a single mirror surface. Therefore, in the case where the mirror surfaces have surface inclination, recording positions fluctuate in the sub-scanning direction among the picture element strings. In the case where the mirror surfaces exhibit variations in reflectivity, the exposure amount differs among the picture element strings even though the recording beam intensity is the same.

Also, in order to stabilize the operation of the rotating polygon mirror, it is necessary to rotate the rotating polygon mirror at a high speed, for example above approximately 3,000 rpm. This requirement also constitutes an obstacle to the recording of an image having a very high level of gradation. Specifically, for example, the recording beam is scanned in the manner mentioned above and is pulse number modulated in accordance with image signals, and the pulse number is controlled within the range of 0 to 1,000 pulses in order to obtain a high level of gradation. In this case, when the number of the mirror surfaces of the rotating polygon mirror is six, the main scanning width is 180 mm, the picture element size is 100 $\mu$m (=0.1 mm), and the rotation speed of the rotating polygon mirror is 3,000 rpm, a single main scanning is carried out for $$1/(3,000 \div 60 \times 6) = 1/300 \text{ second}$$

at the most. Therefore, the frequency of the aforesaid pulses must at least be $$180 \div 0.1 \times 1,000 \times 300 \times 10^{-6} = 540 \text{ MHz}.$$

Though a semiconductor laser can be turned on and off at such a frequency, the drive circuit for producing the pulses at such a high frequency to control the turning on and off becomes very expensive.

SUMMARY OF THE INVENTION

The primary object of the present invention is to provide a light beam scanning recording method wherein a high-gradation image is recorded easily by use of a rotating polygon mirror, and the image quality is not caused to deteriorate by surface inclination and variations in the reflectivity among the mirror surfaces of the rotating polygon mirror.

Another object of the present invention is to provide a light beam scanning recording method which enables formation of a drive control circuit for a semiconductor laser or the like at low cost.

The present invention provides a light beam scanning recording method for recording a continuous tone image on a photosensitive material by scanning a light beam deflected by a rotating polygon mirror on the photosensitive material and carrying out pulse number modulation or pulse width modulation of the light beam in accordance with image signals, wherein the improvement comprises the steps of:

(i) scanning a single picture element string by said light beam a plural number of times which is equal to integral multiples of the number of mirror surfaces of said rotating polygon mirror, and (ii) distributing the number of pulses per picture element or the pulse width per picture element among said plural number of times of scanning so that the total number of pulses per picture element or the total pulse width per picture element in said plural number of times of scanning coincides with a predetermined value.

With the light beam scanning recording mthod in accordance with the present invention wherein a single picture element string is scanned a plural number of times which is equal to integral multiples of the number of mirror surfaces of the rotating polygon mirror, every picture element string is scanned by using all of the mirror surfaces of the rotating polygon mirror the same number of times, and fluctuations in the recording position and fluctuations in the exposure amount do not arise among the picture element strings even though the rotating polygon mirror has surface inclination and variations in the reflectivity among the mirror surfaces.

Also, when the number of pulses per picture element or the pulse width per picture element is distributed among a plural number of times of scanning so that the total number of pulses per picture element or the total pulse width per picture element in the plural number of times of scanning coincides with a predetermined value, the write time for a single picture element can be adjusted to be long even though the rotating polygon mirror is rotated at a high speed, and consequently the frequency of the aforesaid pulses can be minimized. For example, in the case where a rotating polygon mirror having six mirror surfaces is used, a single picture element is scanned 24 times, i.e. by four revolutions of the rotating polygon mirror, and the other conditions are kept the same as in the aforesaid example, the frequency of the aforesaid pulses can be adjusted to be $$540 \div 24 = 22.5 \text{ MHz}.$$

As mentioned above, with the light beam scanning recording method in accordance with the present invention, the adverse effects of surface inclination and variations in the reflectivity among the mirror surfaces of the rotating polygon mirror can be eliminated without provision of a particular correction optical system. Therefore, a continuous tone image of a high image quality can be recorded by use of a cheap apparatus. Also, with the method in accordance with the present invention wherein pulses at a markedly high frequency need not be produced even though a rotating polygon mirror having a high rotation speed is used, the operation control circuit for a semiconductor laser or the like can be formed cheaply.

BRIEF DESCRIPTION OF THE DRAWINGS

FIG. 5 is an explanatory view showing the condition of light beam scanning in the embodiment of the light beam scanning recording method in accordance with the present invention.

DESCRIPTION OF THE PREFERRED EMBODIMENTS

The present invention will hereinbelow be described in further detail with reference to the accompanying drawings.

Figure 1:
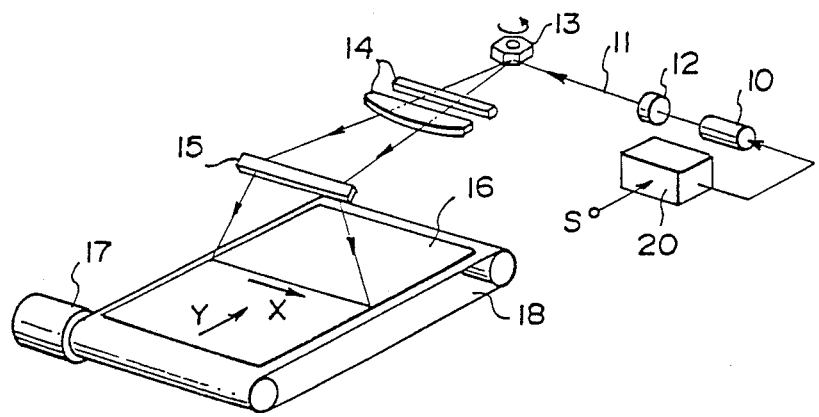
FIG. 1 is a schematic perspective view showing an example of the apparatus for carrying out image recording by an embodiment of the light beam scanning recording method in accordance with the present invention.

FIG. 1 shows a light beam scanning apparatus for recording a continuous tone image by an embodiment of the light beam scanning recording method in accordance with the present invention. With reference to FIG. 1, a laser beam 11 emitted by a semiconductor laser 10 is collimated by a collimator lens 12 and made to impinge upon a rotating polygon mirror 13. The laser beam 11 is reflected and deflected by the rotating polygon mirror 13, made to pass through a converging lens 14 which is usually constituted by an f.θ lens, and reflected by a long mirror 15 so that the laser beam 11 scans a photosensitive film 16 in a main scanning direction as indicated by the arrow X. At the same time, the photosensitive film 16 is moved by an endless belt 18, which is operated by a drive device 17, in a sub-scanning direction as indicated by the arrow Y approximately normal to the main scanning direction as indicated by the arrow X. As a result, the photosensitive film 16 is two-dimensionally scanned by the laser beam 11. Turning on and off of the semiconductor laser 10 are controlled by a control device 20 in accordance with digital image signals S which represent a continuous tone image, and the laser beam 11 is pulse number modulated thereby. Therefore, the continuous tone image which the digital image signals S represent is recorded on the photosensitive film 16.

Figure 2:
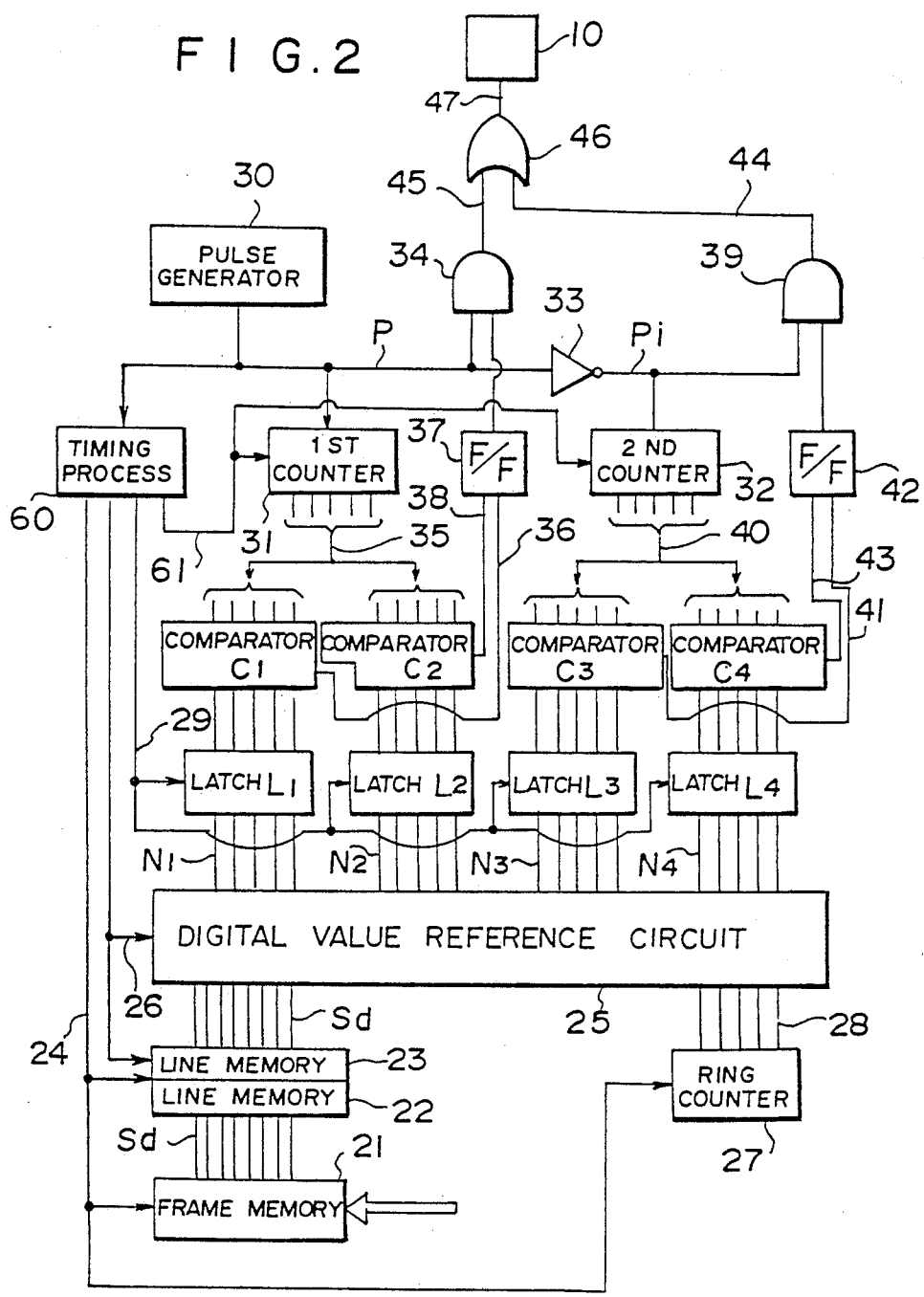
FIG. 2 is a block diagram showing the electric circuit in the apparatus shown in FIG. 1.

Pulse number modulation of the laser beam 11 will hereinbelow be described in detail with reference to FIG. 2 which shows the configuration of the control device 20. The aforesaid digital image signals S are stored in a frame memory 21 in a unit of the signals for a single image. In the course of image recording, the digital image signals S are read from the frame memory 21 in a unit of image signals Sd at a single picture element string in the main scanning direction, and the image signals Sd at the respective picture element string are alternately stored in line memories 22 and 23. Storage of the image signals Sd to the line memories 22 and 23 and read-out therefrom are carried out based on a line clock 24 received from a timing processing circuit 60. Specifically, after the image signals Sd at a first picture element string have been stored in the line memory 22, the line clock 24 is fed so that the image signals Sd at the first picture element string are read from the line memory 22 and sent to a digital value reference circuit 25, and image signals Sd at a second picture element string are read from the frame memory 21 and stored in the line memory 23. When the next line clock 24 is fed, image signals Sd at a third picture element string are stored in the line memory 22, and the image signals Sd at the second picture element string stored in the line memory 23 are read therefrom and sent to the digital value reference circuit 25. Thereafter, each time the line clock 24 is fed, signal read and write are carried out alternately for the line memories 22 and 23. The aforesaid operations are repeated sequentially.

Figure 3:
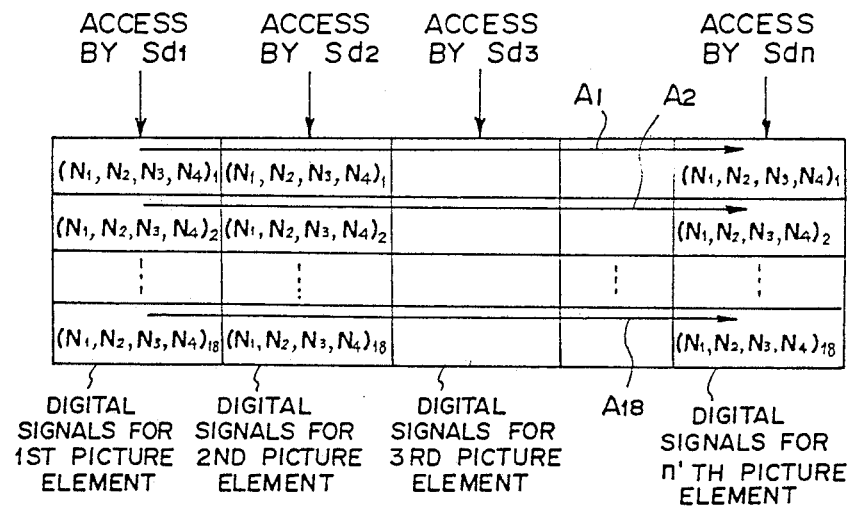
FIG. 3 is an explanatory view showing the concept of the digital signal read in the apparatus shown in FIG. 1.

The digital value reference circuit 25 is constituted by, for example, a programmable read-only memory (PROM), and emits digital signals N1, N2, N3, and N4 (N1≦N2, N3≦N4) in accordance with the values of the fed image signals Sd at respective picture elements (pixels). By way of example, in this apparatus, the rotating polygon mirror 13 having six mirror surfaces is used, and a single picture element string is scanned in the main scanning direction 18 times, i.e. 6 (the number of mirror surfaces)×3 times, by the laser beam 11 and recorded on the photosensitive film 16. Specifically, the digital value reference circuit 25 stores 18 sets of digital signals $(N1,N2,N3,N4)_1$, $(N1,N2,N3,N4)_2$, $(N1,N2,N3,N4)_3$, ..., $(N1,N2,N3,N4)_{18}$ which are inherent to the respective values of the image signals Sd (constituted by, for example, 10-bit signals) each at a single picture element. These digital signal sets are accessed in accordance with the fed image signals Sd, and read from the digital value reference circuit 25. The read of the digital signals will now be described with reference to FIG. 3. When image signals Sd1 to Sdn (n denotes the picture element sequence in the main scanning direction) at a single picture element string are fed to the digital value reference circuit 25, the first set of the digital signals $(N1,N2,N3,N4)_1$ is selected based on the image signal Sd1 at the first picture element from the 18 sets of the digital signals corresponding to the image signal Sd1, and is read out of the digital value reference circuit 25. Then, when a pixel clock 26 is fed from the timing processing circuit 60 to the digital value reference circuit 25, the first set of the digital signals $(N1,N2,N3,N4)_1$ is selected based on the image signal Sd2 at the second picture element from the 18 sets of the digital signals corresponding to the image signal Sd2, and is read out of the digital value reference circuit 25. The digital signal read is carried out up to the n'th picture element (i.e. the last picture element) of the single picture element string. In this manner, the digital signal read is finished for the section as indicated by the arrow A1 in FIG. 3. When the digital signal read has been carried out "n" times in total, the number of the designated line is increased by one by means of a line designating signal 28 which is fed from a ring counter 27 to the digital value reference circuit 25. Then, the digital signal read is carried out for the section as indicated by the arrow A2 in FIG. 3. In the same manner, the number of the designated line is thereafter increased one by one, and digital signal read is carried out up to the section as indicated by the arrow A18 in FIG. 18.

The digital signals N1, N2, N3, and N4 which are sequentially read for the respective picture elements from the digital value reference circuit 25 are latched in latches L1, L2, L3, and L4. The latch timing is synchronized with the timing of the aforesaid digital signal read by latch timing pulses 29 which are the same clock signal as the pixel clock 26.

Figure 4:
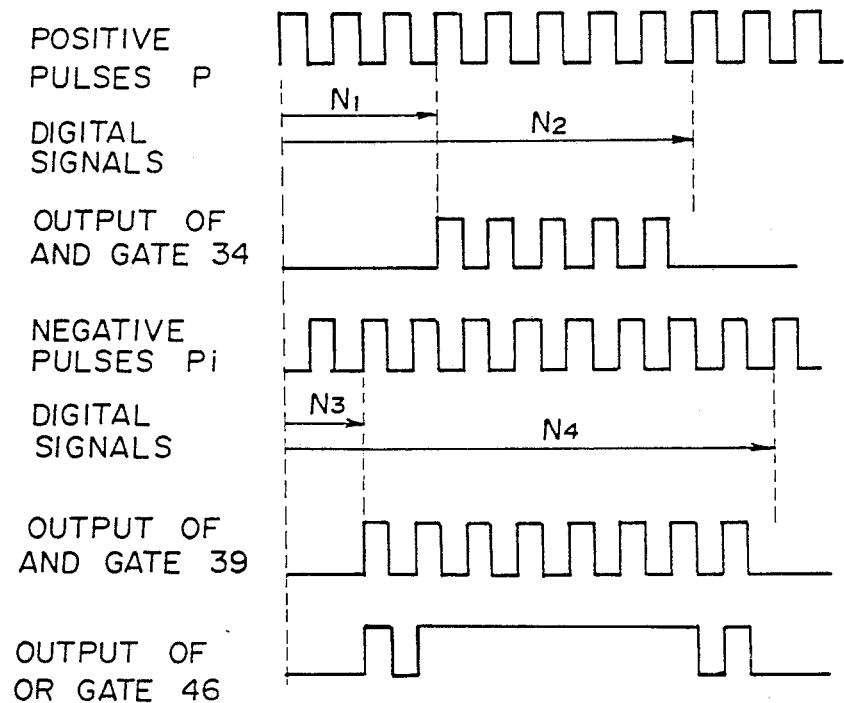
FIG. 4 is a wave form chart showing the wave form of pulses for operating the semiconductor laser in the apparatus shown in FIG. 1.

On the other hand, high-frequency pulses P produced by a high-frequency pulse generator 30 are fed to a first counter 31. The high-frequency pulses P are also fed to a second counter 32 after the phase is inverted by an inverter 33. The high-frequency pulses P are also fed to the timing processing circuit 60 for producing the line clock 24 or the like, and to an AND gate 34. A count value 35 of the high-frequency pulses P counted by the first counter 31 is compared with the latched digital signals N1 and N2 in comparison circuits C1 and C2. The comparison circuit C1 emits a coincidence signal 36 and sets a flip-flop 37 at the time the count value 35 coincides with the digital signal N1. On the other hand, the comparison circuit C2 emits a coincidence signal 38 and resets the flip-flop 37 at the time the count value 35 coincides with the digital signal N2. The output of the flip-flop 37 is fed to the AND gate 34 together with the aforesaid high-frequency pulses P. Therefore, as shown in FIG. 4, the high-frequency pulses P in a number defined by the difference between the digital signals N1 and N2 are emitted from the AND gate 34.

The high-frequency pulses (negative pulses) Pi obtained by phase inversion by the inverter 33 are fed to the second counter and an AND gate 39. A count value 40 of the high-frequency pulses (negative pulses) Pi counted by the second counter 32 is compared with the latched digital signals N3 and N4 in comparison circuits C3 and C4. The comparison circuit C3 emits a coincidence signal 41 and sets a flip-flop 42 at the time the count value 40 coincides with the digital signal N3. On the other hand, the comparison circuit C4 emits a coincidence signal 43 and resets the flip-flop 42 at the time the count value 40 coincides with the digital signal N4. The output of the flip-flop 42 is fed to the AND gate 39 together with the aforesaid high-frequency pulses (negative pulses) Pi. Therefore, as shown in FIG. 4, the high-frequency pulses (negative pulses) Pi in a number defined by the difference between the digital signals N3 and N4 are emitted from the AND gate 39. The first counter 31 and the second counter 32 are reset by reset pulses 61 received from the timing processing circuit 60 in synchronization with latching of the digital signals N1, N2, N3, and N4 for the respective picture elements The output 44 of the AND gate 39 and the output 45 of the AND gate 34 are fed to an OR gate 46. Therefore, pulses 47 having a wave form as shown in FIG. 4 are emitted from the OR gate 46. The pulses 47 are applied to the semiconductor laser 10, and therefore the laser beam 11 emitted by the semiconductor laser 10 is modulated in accordance with the digital signals N1, N2, N3, and N4.

As mentioned above, the digital signals N1, N2, N3, and N4 are emitted as indicated by the arrows A1, A2 and A3, scanned 18 times (by three revolutions of the rotating polygon mirror 13) in the main scanning direction, and image recording based on the image signals Sd at a single picture element string as shown in FIG. 5 is achieved. When a single picture element is taken into consideration, the single picture element is scanned 18 times in accordance with the 18 sets of the digital signals $(N1,N2,N3,N4)_1$, $(N1,N2,N3,N4)_2$, $(N1,N2,N3,N4)_3$, . . . , $(N1,N2,N3,N4)_{18}$. As mentioned above, these 18 sets of the digital signals correspond to the image signals Sd. Consequently, the picture elements are respectively recorded with exposure amounts corresponding to the image signals Sd, and the continuous tone image which the image signals Sd represent is recorded on the photosensitive film 16. For example, in the case where the image signals Sd are of 10 bits as mentioned above, a high-gradation image of 1024 density scale is recorded. The movement speed of the photosensitive film 16 is adjusted so that the film 16 is moved by a distance equal to the size of a single picture element while the laser beam 11 is being scanned 18 times, i.e. while the rotating polygon mirror 13 is being moved three times.

In the case where a single picture element string is scanned by the laser beam 11 a plural number of times which is equal to integral multiples of the number of mirror surfaces of the rotating polygon mirror 13 in the manner mentioned above, every picture element string is scanned by using all of the mirror surfaces of the rotating polygon mirror 13 the same number of times. Therefore, even though the mirror surfaces of the rotating polygon mirror 13 have surface inclination and variations in reflectivity, the respective picture element strings are scanned in the same manner with regard to the recording position and the exposure amount characteristics with respect to the optical amount of the semiconductor laser 10. Also, as mentioned above, since a single picture element string is recorded while the rotating polygon mirror 13 is being rotated a plural number of times, the frequency of the high-frequency pulses P need not be adjusted to be markedly high even though the rotating polygon mirror 13 is rotated at a high speed for the purpose of stabilization of its operation.

In the aforesaid embodiment, the pulses are distributed from the middle of the write period for each picture element to both sides by combining the four digital signals N1, N2, N3, and N4 with one another. Accordingly, it becomes possible to eliminate the problem whereby the middle of each picture element deviates toward the start point or the end point of the main scanning with the laser beam and gives rise to moire patterns or the like.

Also, in the aforesaid embodiment, pulse modulation is carried out by combining the high-frequency pulses P with the high-frequency pulses (negative pulses) Pi with each other. Therefore, in the case where the exposure amount level resolution is the same, the maximum number of pulses necessary per picture element becomes nearly one half as compared with the case where the high-frequency pulses P alone are used. Thus the frequency of the high-frequency pulses P can be minimized.

Though pulse number modulation is carried out in the aforesaid embodiment, it should be understood that the light beam scanning recording method in accordance with the present invention is applicable also to the case where pulse width modulation is carried out instead of pulse number modulation.

I claim:

1. A light beam scanning recording method for recording a continuous tone image on a photosensitive material by scanning a light beam deflected by a rotating polygon mirror on the photosensitive material and carrying out pulse number modulation or pulse width modulation of the light beam in accordance with image signals, wherein the improvement comprises the steps of:
  (i) scanning a single picture element string by said light beam a plural number of times which is equal to integral multiples of the number of mirror surfaces of said rotating polygon mirror, and
  (ii) distributing the number of pulses per picture element or the pulse width per picture element among said plural number of times of scanning so that the total number of pulses per picture element or the total pulse width per picture element in said plural number of times of scanning coincides with a predetermined value.

2. A method as defined in claim 1 wherein the pulses for each picture element are distributed from the middle of a write period for each picture element to both sides thereof.

3. A method as defined in claim 1 wherein pulse modulation is carried out by combining high-frequency pulses and negative high-frequency pulses obtained by phase inversion of said high-frequency pulses with each other.

4. A method as defined in claim 1 wherein said light beam is a laser beam.

* * * * *